Figure 1:
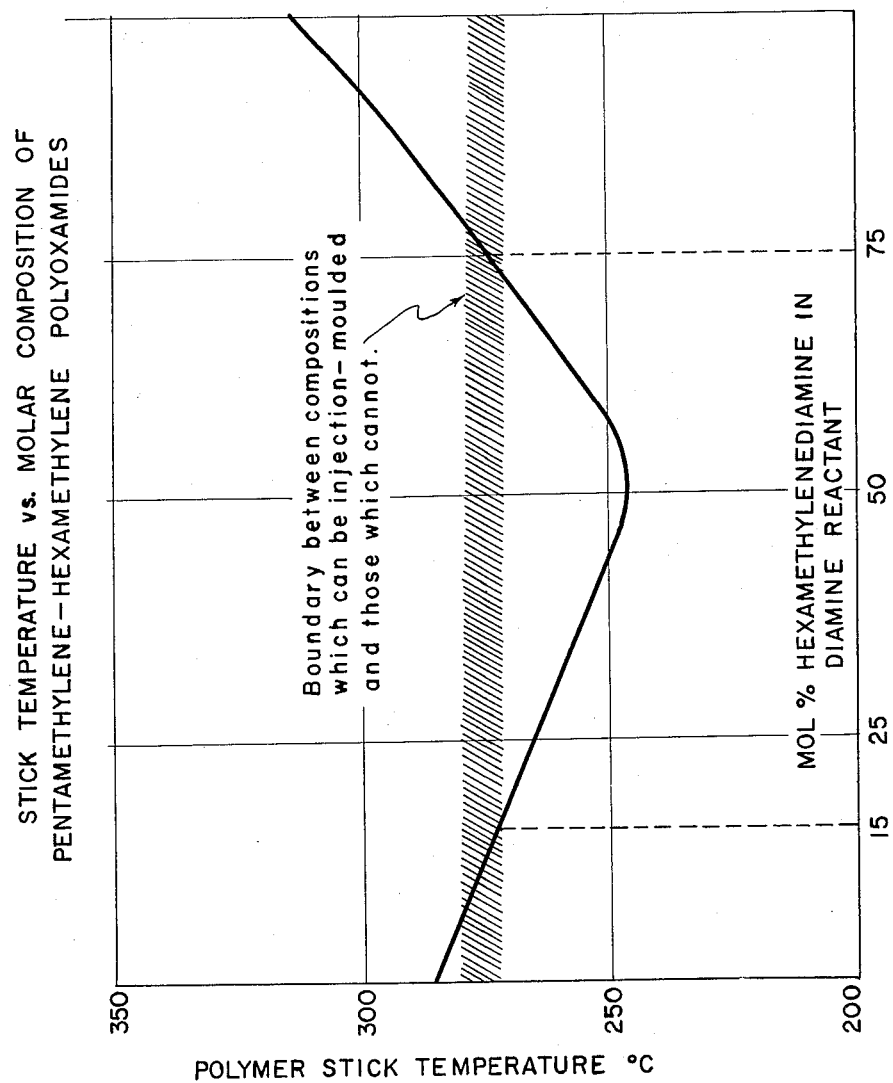

March 28, 1961     C. R. LINDEGREN     2,977,339
COPOLYOXAMIDES

Filed May 13, 1954     4 Sheets-Sheet 4

INVENTOR
CARL R. LINDEGREN

BY
*A. McAlevy*
ATTORNEY

United States Patent Office 2,977,339
Patented Mar. 28, 1961

2,977,339
COPOLYOXAMIDES

Carl R. Lindegren, New Castle, Del., assignor to E. I. du Pont de Nemours and Company, Wilmington, Del., a corporation of Delaware Filed May 13, 1954, Ser. No. 429,469

1 Claim. (Cl. 260—78)

This invention relates to linear copolyoxamides in which the groups separating recurring oxamido groups comprise at least two members of the class consisting of tetramethylene, pentamethylene and hexamethylene groups.

Heretofore numerous linear polyoxamides have been disclosed. In some instances the physical properties of particular polyoxamides have been studied in considerable detail. In general, however, the lower alkylene polyoxamides have had melting points which exceed, or closely approach the decomposition temperatures of these polymers. For this reason these polyoxamides have not been employed commercially in plastics applications.

For molding operations, and especially for injection molding, it is essential that the material to be molded or shaped be stable at temperatures needed to produce adequate flow. This stability implies constancy of desirable properties, such as toughness, tensile strength, etc., during the shaping process; for injection molding, this constancy of desirable properties should be retained at the temperatures required for adequate flow for a substantial period of time, e.g. about twenty minutes. The polyoxamides exhibit sufficient thermal stability for use in injection molding at temperatures up to about 290°–295° C., but to produce adequate flow in injection molding applications it is necessary to use a cylinder temperature which is at least 10° to 25° above the "stick temperature" ("stick temperature" being defined as the temperature at which a specimen of the polymer displays a tendency to stick to a smooth surface). Accordingly, a polyoxamide must have a "stick temperature" of not more than 278° C., to be a good moldable resin.

The following table shows the "stick temperatures" of polyoxamide homopolymers of straight chain diamines having from two to ten carbon atoms. For sake of brevity a nomeclature system is herein used wherein the number of carbon atoms in the straight chain diamine with terminal —$NH_2$ groups is first designated followed by a number designating the number of linear carbon atoms in the dibasic acid component (for example, 102 is decamethylene polyoxamide).

TABLE I
Effect of diamine chain length on stick temperature of polyoxamide homopolymers

| Polyoxamide | Polymer Stick Temp., °C. |
| --- | --- |
| 22 | ca. 450 (decomp.). |
| 42 | 375 (decomp.). |
| 52 | 285. |
| 62 | 320 (decomp.). |
| 72 | 260. |
| 82 | 275. |
| 102 | 250. |

In copending U.S. patent application of Stamatoff, filed June 14, 1952, the effect of introducing methyl substituents on the carbon atoms of the diamine component was disclosed, and it was reported that the "stick temperature" could be lowered by methyl substitution. For example, the stick temperature of 3-methyl 72 was found to be 195–205°, a suitable temperature for either molding or spinning. The latter polyoxamide was especially attractive in that it also had a resistance to degradation by light which was superior to that of 66 (hexamethylene polyadipamide).

Generally speaking, however, the long chain terminal diamines, and the methyl-substituted diamines employed by Stamatoff, are sufficiently expensive to compensate at least in part for the economic advantage in using a very cheap dibasic acid, namely, oxalic acid. On the other hand, the manufacture of adipic acid by oxidation of cyclohexane (followed by oxidation of cyclohexanol, cyclohexanone and other primary products) produces large amounts of succinic and glutaric acids as by-products, and if necessary or desirable these materials could be converted to straight chain $C_4$ and $C_5$ diamines by known methods. Since oxalic acid is the cheapest, or one of the cheapest, of the dibasic acids, the raw material situation is thus favorable to the manufacture of polyoxamides from these available sources of diamines. Accordingly, if the poor qualities of the products could be overcome, important new fields of plastics applications for polyoxamides would thus be opened up. The present invention is directed towards achieving that objective.

It has been discovered, according to this invention, that specific combinations of straight chain diaminoalkanes generally yield copolyoxamides which have low enough "stick temperatures," and sufficiently good thermal stability under conditions of flow, to permit their use in plastics applications, especially in injection molding. The particular combinations of these diamines, and the relative proportions thereof which produce this useful result, are indicated in Table II.

TABLE II
Copolyoxamides of straight chain diamines

| Copolymer | Molar Ratio | Polymer Stick Temp. | $_ninh$ | Equil. Water Absorption, Percent |
| --- | --- | --- | --- | --- |
| 52/62 | [1] 50:50 | 249 | 1.05 | 3.0 |
|  | 40:60 | 257 | 0.65 | 2.5 |
|  | 61:39 | 256 |  | 2.71 |
|  | 20:60:20 | 243 |  | 3.1 |
| 42/52/62 | [1] 20:50:30 | 234 | 1.06 |  |
|  | 20:40:40 | 248 | 0.96 |  |
|  | 20:30:50 | 269 | 0.75 |  |
|  |  |  | 1.03 |  |
| 42/52 | [1] 25:75 | 280 | 0.74 |  |
|  | 50:50 | 294 | insol. |  |
| 42/62 | 40:60 | 278 | 0.57 |  |
|  | 50:50 | 288 |  |  |
|  | 25:75 | 283 | 0.45 |  |
| 22/42/62 | 10:35:55 | 260 | 0.57 |  |
|  | 20:40:40 | 266 | 0.59 |  |
|  | 7:37:56 | 266 | 0.23 |  |
| 22/52 | 7:93 | 280 | 0.16 |  |
|  | 20:80 | 293 | 0.16 |  |

[1] Minimum stick temperature over range of compositions.
$_ninh$ Inherent viscosity, defined by the following formula $$_ninh = \frac{2.303 \log {_nrel}}{0.5000}$$

where $$_nrel = \frac{_nsolution}{_nsolvent}$$

$_nsolution$ being the viscosity of a solution of 0.5 gram of the polymer in 100 ml. m-cresol at 25° C., $_nsolvent$ being the viscosity of m-cresol at the same temperature.

Among the best compositions listed in Table II are the 42/52/62 and 52/62 copolymer compositions. A comparison of the physical properties of the preferred 42/52/62 and 52/62 compositions with the corresponding properties of 66 nylon is given in the following table.

TABLE III

*Properties of 42/52/62 and 52/62 copolyoxamides*

| Property | 66 Control | 42/52/62 (20/60/20) | 52/62 (50/50) |
|---|---|---|---|
| Hardness—M Scale | 40 | 92 | 87 |
| Density | 1.14 | 1.22 | 1.21 |
| Heat dist. temp., 66 p.s.i., °C | 204 | 204 | 200 |
| Heat dist. temp., 264 p.s.i., °C | 78 | 93 | 94 |
| Tensile strength, $10^3$ p.s.i. | 10.9 | 12.6 | 11.7 |
| Elongation, percent | 50+ | 30 | 4-26 |
| Impact strength, 25° C., Izod | 1.0 | 1.03 | 1.07 |
| Mandrel bend, percent tough | 100 | 100 | 100 |
| Stiffness, 25° C., $10^5$ p.s.i. | 2.2 | 3.86 | 4.33 |
| Deformation (2,000 p.s.i.) 50° C., percent | 1.4 | 1.26 | 0.62 |
| Water absorption, percent equilibrium | 8.3 | 3.06 | 3.04 |
| Water absorption, percent ASTM | 1.5 | 0.35 | 0.21 |
| Flammability in./min. or in.²/min | [1] SE | SE | SE |

[1] SE—Self-extinguishing.

The copolyoxamides mentioned in the foregoing tables were prepared by reaction between an oxalate ester (di-n-butyl) and a mixture of the diamines. In a generally applicable procedure, which was found to be quite satisfactory, the reactants were mixed in the presence of an inert solvent (alcohols such as methyl, ethyl, n-butyl, etc., hydrocarbons such as benzene, toluene, etc., or other inert anhydrous solvent, can be used) at room temperature without application of external heat, to form a prepolymer, followed by removal of solvent and further heating of the prepolymer at a temperature 20 to 30° above the stick temperature for a period of from ten minutes to two hours. More specifically the process of preparing the copolyoxamides is set forth in the following examples.

EXAMPLE 1.—42/52/62 TERPOLYMER (20:50:30)

To a cooled solution of 6.010 g. (.0588 mol) of pentamethylenediamine, 2.169 g. (.025 mol) tetramethylenediamine and 4.189 (.0361 mol) hexamethylenediamine in 20 ml. of dry benzene, was added with rapid stirring 24.161 g. (0.1195 mol) of dibutyl oxalate. The traces of oxalate ester were washed into the mixture with 5 ml. additional benzene. A very rapid exothermic reaction ensued, during which stirring was continued until the prepolymer set up as a white solid. The prepolymer was allowed to stand for one hour under nitrogen and then polymerized for fifty-five minutes at 274° C. The inherent viscosity of the polymer in m-cresol was 0.96. It had polymer stick temperature of 234° C. and was injection molded at 265° C.

EXAMPLE 2.—52/62 COPOLYMER (50:50)

A prepolymer was prepared by the addition with stirring of 23.046 g. (0.1140 mol) dibutyl oxalate to a cooled solution of 5.729 g. (.0561 mol) pentamethylenediamine and 6.726 g. (.0579 mol) hexamethylene diamine in 25 ml. of toluene. After standing under nitrogen for one hour the prepolymer was polymerized for fifty-five minutes at 288° C. The polymer had an inherent viscosity of 0.71 and a polymer stick temperature of 243° C.

EXAMPLE 3.—52/62 COPOLYMER (50:50)

A second copolymer was prepared in a manner similar to that indicated in Example 2 using the same proportion of diamines and oxalate ester with the addition of .01% phosphorous acid (based on polymer weight). The polymer obtained had an inherent viscosity of 0.84 and a polymer stick temperature of 245° C.

It was found that somewhat similar results, in the preparation of the copolyoxamides, were obtained through the use of polymerization catalysts under the conditions otherwise the same as hereinabove illustrated. Thus it was found that 0.01% (based on the weight of reactants) of phosphorous acid catalyzed the polymerization. The presence of such catalysts was not necessary, however. For example, 42/52/62, polymerized in the absence of catalyst had an inherent viscosity of 0.96. A 52/62 copolymer which was prepared from slightly impure diamine had an inherent viscosity of 0.71. Use of phosphorous acid catalyst in a second batch increased the viscosity to 0.84. When the diamine was highly purified a 52/62 copolymer with an inherent viscosity of 1.05 was obtained in the presence of the catalyst.

Among the significant properties which are outstanding in 52/62 and 42/52/62 polymers, fatigue endurance limit (defined as the stress limit below which samples will not fail when subjected to repeated reversed axial stress, i.e. more than $10^6$ times) was particularly favorable (5000 p.s.i.). Compared with 66 nylon, these copolyoxamides exhibited lower water absorption, a high degree of hardness, higher stiffness, and lower creep.

Figure 2:
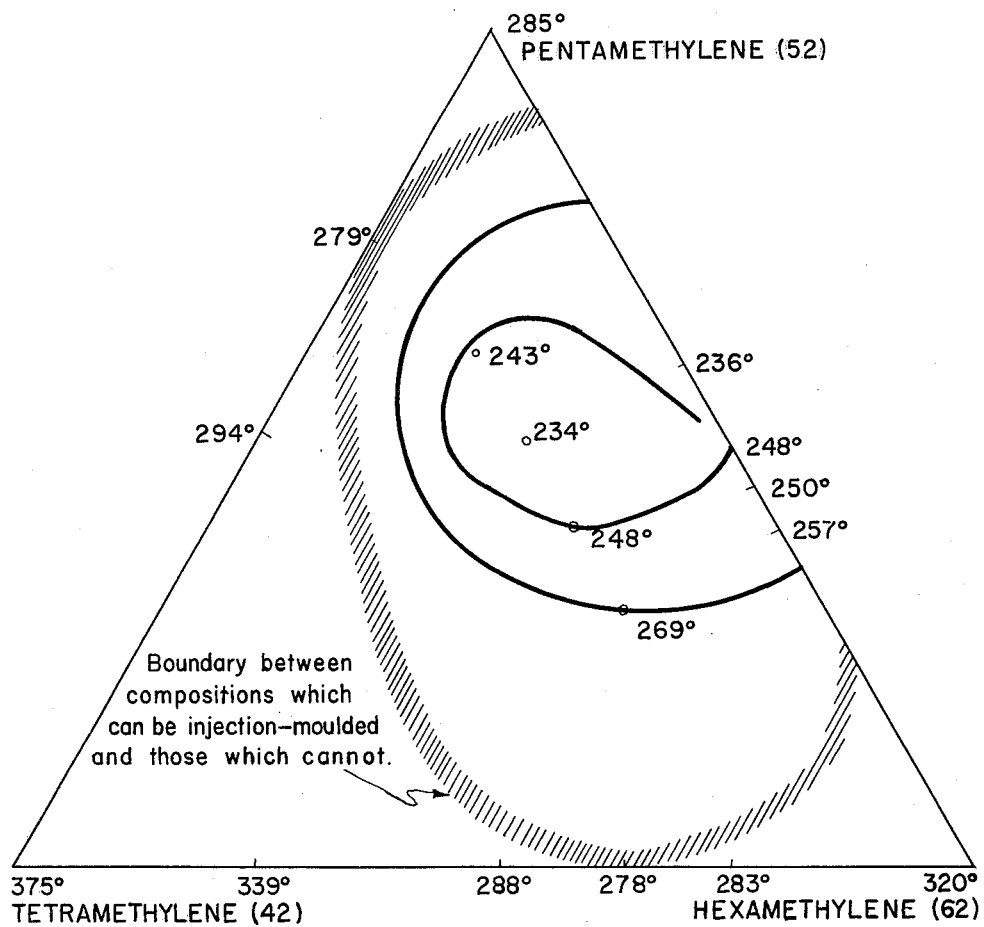
Figure 3:
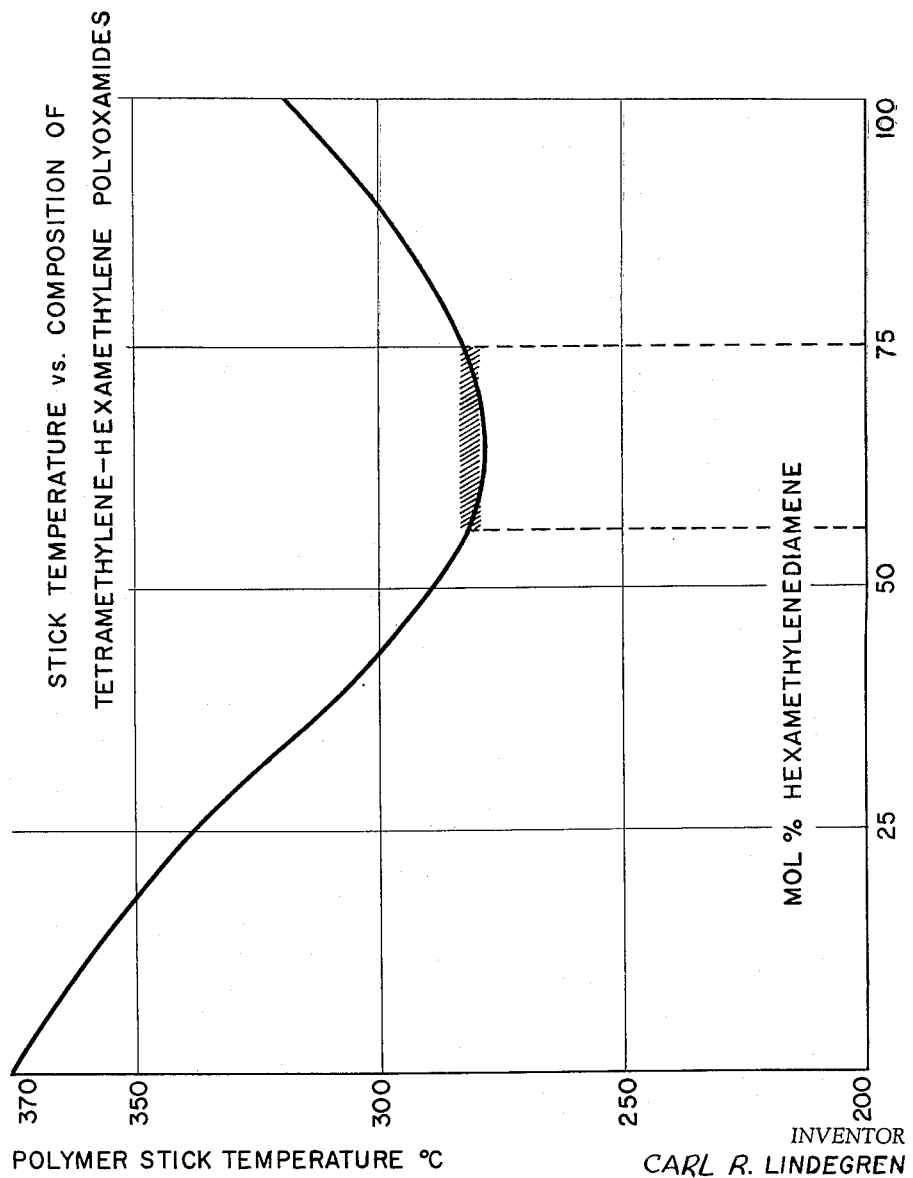
Figure 4:
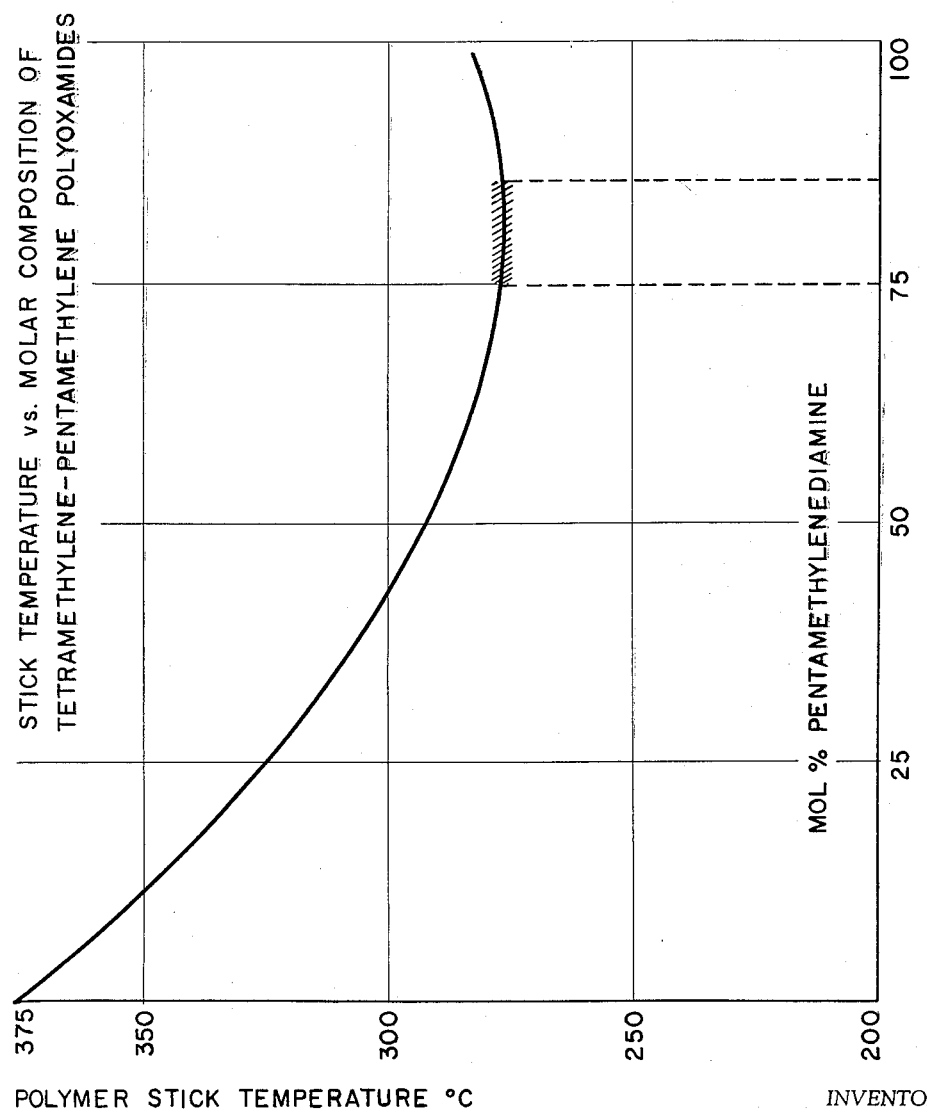

As hereinabove indicated, the "stick temperature" of the copolyoxamides depends not only on the nature of the respective diamines, but also on the relative proportions thereof. The relationship between the percentage composition of the diamine in 52/62 and 42/52/62 polymers is shown in Figures 1 and 2. Figure 1 shows that the critical range for 52/62 is 15 to 75% (mol basis) of hexamethylene diamine, in the diamine component. Figure 2 shows that the critical range for 42/52/62 terpolymer is bounded by a curve in a three component (42-62-52) diagram beginning at about 90% pentamethylene, 10% hexamethylene, 0% tetramethylene, approaching the 42-52 line tangentially at 75% pentamethylene, 0% hexamethylene and 25% tetramethylene, leaving this point and line tangentially, and approaching tangentially the 42-62 line at 65% hexamethylene, 35% tetramethylene and 0% pentamethylene, leaving this line tangentially and crossing to a point on the 52-62 line at about 75% hexamethylene, 25% pentamethylene and 0% tetramethylene, said boundary constituting an isotherm defining the compositions having a "stick temperature" of 278° C. Figure 3 shows that in the case of 42/62 polymers only a rather narrow range of compositions gives the desired results, this range being about 57% to 70% hexamethylene diamine in the diamine component. A still narrower range of molar composition (75% to 80% pentamethylene diamine) has a "stick temperature" at the minimum range needed for plastics application, as shown in Figure 4, when the polymer is 42/52.

Although the percentages hereinabove set forth define compositions in which the sole diamine components are tetramethylene, pentamethylene, and hexamethylene in combination, or any two of these components, it will be understood that similar percentage limits apply when very small amounts of ethylene diamine, trimethylene diamine, or in fact any other alkylene diamine or mixture thereof is used, in sufficiently small quantity, in addition to the said components. This additional diamine should not be used in large enough quantity, however, to raise the "stick temperature" of the multicomponent polymer to above about 278° C. In this connection, it is noteworthy that the introduction of 20 mol percent of ethylene diamine (other components being 40% tetramethylene diamine +40% hexamethylene diamine—cf. Figure 4) resulted in a stick temperature of 266° (cf. Figure 3 for comparison). Thus it would appear that when substantial amounts of ethylene diamine are present along with appropriate quantities of the other diamine products of suitable "stick temperature" are obtainable. Copolyoxamides prepared from trimethylene diamine were found to be melt unstable when trimethylene diamine was present in substantial amount in the diamine reactant.

The copolyoxamides of this invention are valuable and useful in a variety of injection molding and extrusion applications, including the extrusion of bristles, filaments, etc. They can be produced as molding powder, and can be used as such without plasticization. The weathering properties of these polymers are at least about as good as the corresponding properties of other high quality nylons, such as 66, and these properties can be further improved by the use of specific stabilizers.

I claim:

A copolyoxamide in which the groups separating recurring oxamido groups as integral parts of the main polymer chain are tetramethylene, pentamethylene and hexamethylene groups, in the mol proportions of 20%, 60% and 20% respectively.

References Cited in the file of this patent

UNITED STATES PATENTS

| | | |
|---|---|---|
| 2,252,554 | Carothers | Aug. 12, 1941 |
| 2,336,824 | Wiley | Dec. 14, 1943 |
| 2,558,031 | Allen et al. | June 26, 1951 |

FOREIGN PATENTS

| | | |
|---|---|---|
| 114,623 | Sweden | July 31, 1945 |

OTHER REFERENCES

Catlin et al.: J. Polymer Science, vol. 2, 1947, pages 412—418.

Evans et al.: J. Amer. Chem. Scie., vol. 72, page 2018.